US012255411B2

(12) United States Patent
Wang et al.

(10) Patent No.: US 12,255,411 B2
(45) Date of Patent: Mar. 18, 2025

(54) FREQUENCY RECONFIGURABLE PHASED ARRAY SYSTEM AND MATERIAL PROCESSING METHOD PERFORMED THEREBY

(71) Applicant: INDUSTRIAL TECHNOLOGY RESEARCH INSTITUTE, Hsinchu (TW)

(72) Inventors: Joseph Poujiong Wang, New Taipei (TW); Chia Ching Huang, Changhua County (TW); Wei-Ji Chen, Tainan (TW); Yueh-Lin Tsai, Yunlin County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 753 days.

(21) Appl. No.: 17/135,538

(22) Filed: Dec. 28, 2020

(65) Prior Publication Data

US 2022/0190475 A1 Jun. 16, 2022

(30) Foreign Application Priority Data

Dec. 16, 2020 (TW) ................................ 109144534

(51) Int. Cl.
*H05B 6/72* (2006.01)
*H01Q 3/26* (2006.01)
(Continued)

(52) U.S. Cl.
CPC ............. *H01Q 3/38* (2013.01); *H01Q 3/2658* (2013.01); *H01Q 3/28* (2013.01); *H05B 6/72* (2013.01); *H05B 6/6435* (2013.01)

(58) Field of Classification Search
CPC .......... H01Q 3/38; H05B 6/72; H05B 6/6435; H05B 6/66; H05B 6/68; H05B 6/74; H05B 6/46
(Continued)

(56) References Cited

U.S. PATENT DOCUMENTS 7,319,427 B2 1/2008 Antonik
7,511,665 B2 3/2009 Antonik
(Continued)

FOREIGN PATENT DOCUMENTS

CN 103004288 B 3/2013
CN 109511191 * 3/2019
(Continued)

OTHER PUBLICATIONS

Haider et al, Eigenvalue Analysis of Microwave Oven, IJ Scientific & Engineering Research, vol. 4, Issue 9, pp. 2473-2477 (Sep. 2013) (Year: 2024).*

(Continued)

*Primary Examiner* — Steven W Crabb
*Assistant Examiner* — Frederick F Calvetti
(74) *Attorney, Agent, or Firm* — Maschoff Brennan

(57) ABSTRACT

A frequency reconfigurable phased array system comprises a signal generator outputting a power signal with an adjustable frequency, a plurality of radio frequency (RF) modules receiving the power signal, a control module generating excitation mode parameter sets and material processing event sets, a first database storing the excitation mode parameter sets, and a second database storing the material processing event sets. The control module generates a material processing schedule by selecting one of the material processing event sets based on a material recipe, an average power, and a total time of a material, and controls a signal frequency of the signal generator according to the material (Continued)

processing schedule and the excitation mode parameter sets, and a RF phase and a RF power of each of the RF modules, to have the RF modules generating a power signal.

16 Claims, 5 Drawing Sheets

(51) Int. Cl.
*H01Q 3/28* (2006.01)
*H01Q 3/38* (2006.01)
*H05B 6/64* (2006.01)

(58) Field of Classification Search
USPC .................................................. 219/482, 750
See application file for complete search history.

(56) References Cited

U.S. PATENT DOCUMENTS

| | | | | |
|---|---|---|---|---|
| 7,646,326 | B2 | 1/2010 | Antonik | |
| 8,193,974 | B2 | 6/2012 | Logan | |
| 8,466,829 | B1 | 6/2013 | Volman | |
| 8,948,718 | B2 | 2/2015 | Woodsum | |
| 9,070,972 | B2 | 6/2015 | Wang | |
| 9,154,353 | B2 | 10/2015 | Woodsum | |
| 9,161,390 | B2 * | 10/2015 | Gelbart | H05B 6/686 |
| 9,215,756 | B2 * | 12/2015 | Bilchinsky | H05B 1/02 |
| 9,414,444 | B2 | 8/2016 | Libman | |
| 9,459,346 | B2 | 10/2016 | Einziger | |
| 9,562,968 | B2 | 2/2017 | Wu | |
| 9,609,692 | B2 | 3/2017 | Bilchinsky | |
| 10,079,633 | B2 | 9/2018 | Elwell | |
| 10,247,815 | B1 | 4/2019 | Koubiadis | |
| 10,305,717 | B2 | 5/2019 | Woodsum | |
| 10,541,472 | B2 | 1/2020 | Rose | |
| 10,545,232 | B2 | 1/2020 | Liu | |
| 11,289,806 | B1 * | 3/2022 | Wyse | H01Q 3/26 |
| 2009/0236335 | A1 * | 9/2009 | Ben-Shmuel | B65D 81/3453 219/710 |
| 2013/0062334 | A1 * | 3/2013 | Bilchinsky | H05B 6/00 219/482 |
| 2013/0306627 | A1 * | 11/2013 | Libman | H05B 6/687 219/709 |
| 2017/0290104 | A1 * | 10/2017 | Bullo | H05B 6/6438 |
| 2017/0290105 | A1 * | 10/2017 | Gambato | H05B 6/68 |
| 2018/0146518 | A1 * | 5/2018 | Ma | H05B 6/686 |
| 2019/0098709 | A1 * | 3/2019 | Guatta | H05B 6/687 |
| 2019/0166659 | A1 * | 5/2019 | Elboim | H05B 6/72 |
| 2019/0394841 | A1 * | 12/2019 | Durnan | H05B 6/686 |
| 2020/0170083 | A1 * | 5/2020 | Zickel | H05B 6/6447 |
| 2022/0264709 | A1 * | 8/2022 | Zoellner | A23L 5/15 |

FOREIGN PATENT DOCUMENTS

| | | | |
|---|---|---|---|
| CN | 210112318 | * | 2/2020 |
| CN | 210112318 U | | 2/2020 |
| DE | 102014106031 | * | 10/2015 |
| EP | 2499880 | * | 3/2017 |
| EP | 3324705 | * | 5/2018 |
| EP | 3550936 | * | 10/2019 |
| EP | 3612005 | * | 2/2020 |
| TW | 201907506 A | | 2/2019 |
| WO | WO2007/096878 | * | 8/2007 |
| WO | WO2011058538 | * | 5/2011 |
| WO | WO2011138679 | * | 10/2011 |
| WO | WO2011138680 | * | 11/2011 |
| WO | WO2015099650 | * | 7/2015 |

OTHER PUBLICATIONS

Taiwan office action dated Aug. 23, 2021 as received in application No. 109144534.
Shao et al., "Adaptive Frequency Offset Selection in Frequency Diverse Array Radar" 2014.
Basit et al., "Adaptive transmit beamspace design for cognitive FDA radar tracking" Nov. 2019.
Antonik "An Investigation of a Frequency Diverse Array" Apr. 2009.
Wang et al., "An Overview on Time/Frequency Modulated Array Processing" Mar. 2017.
Khabbazibasmenj et al., "Efficient Transmit Beamspace Design for Search-Free Based DOA Estimation in MIMO Radar" Mar. 2014.
Yao et al., "Frequency Diverse Array Antenna Using Time-Modulated Optimized Frequency Offset to Obtain Time-Invariant Spatial Fine Focusing Beampattern" Oct. 2016.
Zubair et al.,"Frequency Diverse Array Radar: New Results and Discrete Fourier Transform Based Beampattern" Dec. 2020.
Antonik et al., "Frequency diverse array radars" 2006.
Akkoc et al., "Investigation of Planar Frequency Diverse Array Antenna in Concentric Circular Geometry" Nov. 2019.
Antonik et al., "Multi-mission multi-mode waveform diversity" 2006.
Zhang et al., "OFDM Chirp Waveform Design Based on Imitating the Time-Frequency Structure of NLFM for Low Correlation Interference in MIMO Radar" Dec. 2020.
Li et al., "OFDM Chirp Waveform Diversity Design With Correlation Interference Suppression for MIMO Radar" Jul. 2017.
Wang et al.,"Overview of frequency diverse array in radar and navigation applications" Oct. 2015.
Zhuang et al., "Precisely beam steering for frequency diverse arrays based on frequency offset selection" Dec. 2020.
Wang "Space-Time Coding MIMO-OFDM SAR for High-Resolution Imaging" Aug. 2011.

* cited by examiner

FREQUENCY RECONFIGURABLE PHASED ARRAY SYSTEM AND MATERIAL PROCESSING METHOD PERFORMED THEREBY

CROSS-REFERENCE TO RELATED APPLICATION

This non-provisional application claims priority under 35 U.S.C. § 119(a) on Patent Application No(s). 109144534 filed in Taiwan, ROC on Dec. 16, 2020, the entire contents of which are hereby incorporated by reference.

TECHNICAL FIELD

This disclosure relates to a frequency reconfigurable phased array system and a material processing method performed thereby.

BACKGROUND

The development of microwave heating technology has been applied to various fields to provide energy to the object to be heated and placed in the microwave chamber. Taking a microwave oven as an example, the magnetron of the microwave oven converts electrical energy into microwave energy, so that the water molecules of the object to be heated in the microwave cavity rub against and collide with each other to achieve a heating effect. Since the magnetron of the microwave oven radiates electromagnetic waves in the form of standing waves, it may cause uneven heating of the object to be heated. Therefore, the existing auxiliary technology to improve the uniformity of the electromagnetic field includes rotating the object to be heated with a mechanical turntable, or using a microwave stirrer to periodically change the load state of the magnetron. However, whether it is a mechanical turntable rotation or a microwave stirrer to improve the uneven heating phenomenon, the effect it can achieve is still very limited.

SUMMARY

In view of the above, this disclosure provides a frequency reconfigurable phased array system and a material processing method performed thereby to meet the above requirements.

According to one embodiment of this disclosure, a frequency reconfigurable phased array system, adapted to a material to be processed, includes a signal source, configured to output an power signal with an adjustable frequency; a plurality of radio frequency (RF) modules, which are signal-transmittably connected to the signal source to receive the power signal; a control module, which is signal-transmittably connected to the signal source and the RF modules, wherein the control module generates a plurality of mode excitation parameter sets according to an electromagnetic field distribution uniformity and generates a plurality of materials processing event set according to an energy distribution uniformity; a first database, which is signal-transmittably connected to the control module and stores the mode excitation parameter sets; and a second database, which is signal-transmittably connected to the control module and stores the material processing event sets; wherein the control module further generates a material processing schedule based on a material recipe, an average power, and a total time those are corresponding to the material to be processed; wherein the control module controls a source operating frequency of the signal source and a RF phase and a RF operating power of each of the RF modules according to the material processing schedule, and the mode excitation parameter sets control the signal source to feed the power signal corresponding to the source operating frequency of the signal source to the RF modules, to have the RF modules controlling the power signal to radiate an energy to a cavity.

According to one embodiment of this disclosure, a material processing method performed by a frequency reconfigurable phased array system, adapted to a material to be processed, the method including: generating, by a control module, a plurality of mode excitation parameter sets based on an electromagnetic field distribution uniformity, and generating a plurality of material processing event sets based on an energy distribution uniformity; selecting, by the control module, one of the material processing event sets to generate a material processing schedule based on a material recipe, an average power, and a total time those are corresponding to the material to be processed; and controlling, by the control module, a source operating frequency of a signal source and a RF phase and a RF operating power of each of a plurality of RF modules according to the material processing schedule and the mode excitation parameter sets, to have the RF modules controlling a power signal to radiate an energy to a cavity; wherein the RF modules are signal-transmittably connected to the signal source to receive the power signal output by the signal source.

The foregoing will become better understood from a careful reading of a detailed description provided herein below with appropriate reference to the accompanying drawings.

DETAILED DESCRIPTION

Figure 1:
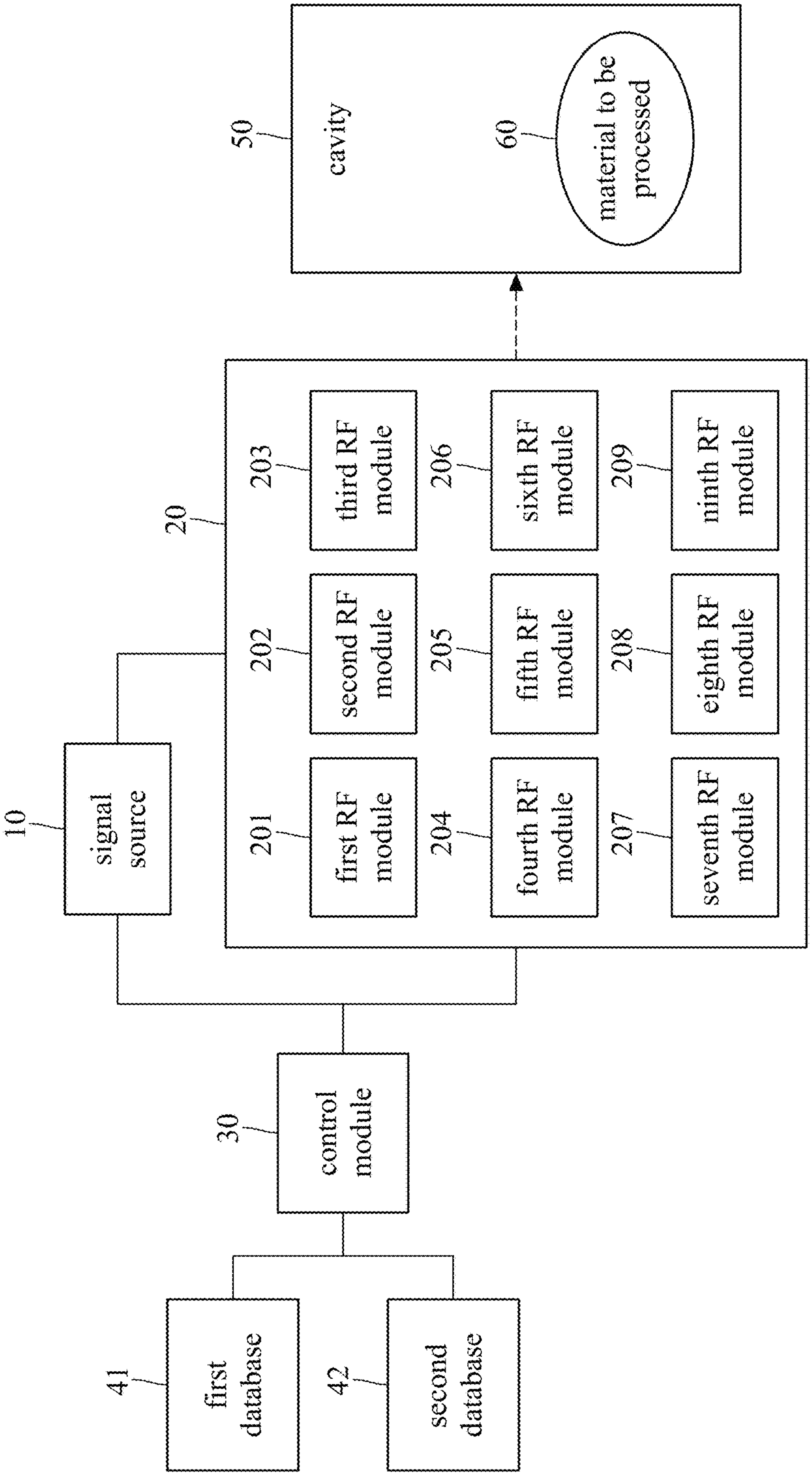
FIG. 1 is a block diagram of a frequency reconfigurable phased array system according to an embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 2:
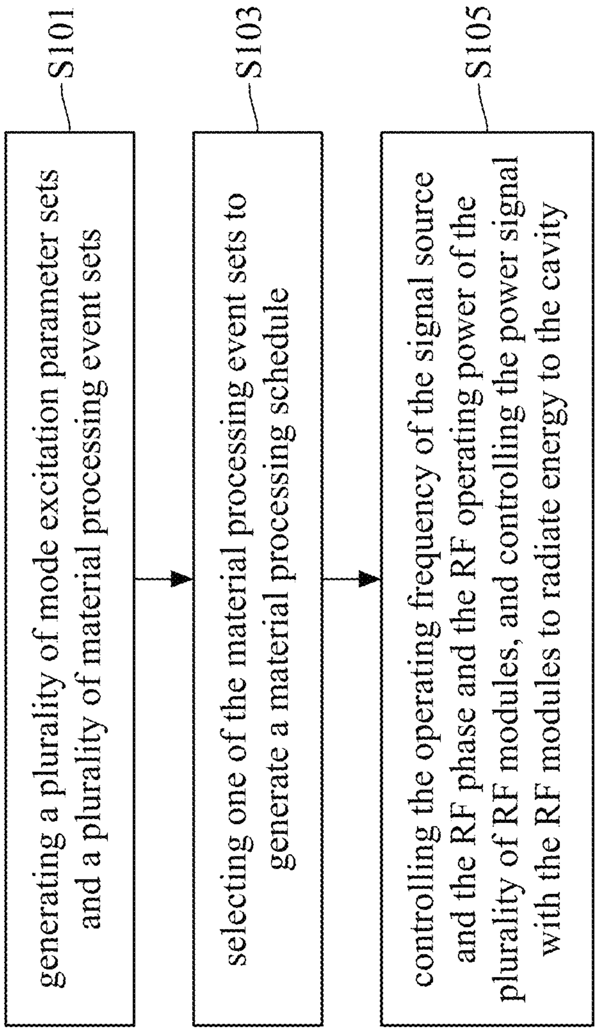
FIG. 2 is a flowchart of a material processing method using the frequency reconfigurable phased array system according to an embodiment.

Please refer to FIG. 1 and FIG. 2, wherein FIG. 1 is a block diagram of a frequency reconfigurable phased array system according to an embodiment, and FIG. 2 is a flowchart of a material processing method using a frequency reconfigurable phased array system according to an embodiment.

The frequency reconfigurable phased array system shown in this disclosure includes a signal source 10, a RF module 20, a control module 30, a first database 41 and a second database 42, wherein the RF module 20 may be one or more RF modules. The RF modules 20 shown in FIG. 1 include a first RF module 201, a second RF module 202, a third RF module 203 up to a ninth RF module 209. The number of RF modules shown in FIG. 1 is only an example, and this disclosure does not limit the number of RF modules. To make the present disclosure easier to understand, the first RF module 201, the second RF module 202, the third RF module 203 up to the ninth RF module 209 shown in FIG. 1 will be collectively referred to as the RF modules 20. In other words, the RF modules 20 are referred to as a plurality of RF modules.

The signal source 10 is signal-transmittably connected to the RF modules 20 and the control module 30, and the control module 30 is signal-transmittably connected to the first database 41 and the second database 42, wherein the signal source 10 may be electrically connected to the RF modules 20, and the control module 30 may be electrically or communicatively connected to the signal source 10, first database 41 and the second database 42. The first database 41 and the second database 42 can be accessed from the control module.

In one embodiment, the signal source 10 is a signal source capable of outputting a power signal with a controllable frequency; the RF module 20 is an antenna array configured to radiate energy to a cavity (for example, a cavity 50 shown in FIG. 1), wherein the cavity is a microwave resonant cavity. The control module 30 is, for example, a device with computing capabilities such as a processor and a controller, and the control module 30 can also be a computer, tablet, or another device with a user interface, receiving information and/or instructions about the material to be processed, the first database 41 and the second database 42 are the database in the memory of the control module 30, or the first database 41 and the second database 42 can be a hard disk connected to the control module 30 etc.

In addition, each of the RF modules 201 up to 209 includes a phase shifter module and a power amplifier. The control module 30 controls the RF phase and the RF operating power of the RF modules 201 up to 209 by controlling the RF phase of the RF modules 201 up to 209 through phase shifter module, and controlling the RF operating power of the RF modules 201 to 209 through the power amplifier.

In FIG. 2, please refer to step S101 of generating a plurality of mode excitation parameter sets and a plurality of material processing event sets. Each of the mode excitation parameter sets includes a plurality of channel weight values respectively corresponding to the RF phase and RF operating power of each of the RF modules. The control module 30 generates a plurality of mode excitation parameter sets according to an electromagnetic field distribution uniformity, and generates a plurality of material processing event sets according to an energy distribution uniformity. In one embodiment, the control module 30 pre-controls each of the RF modules 20 under an operating frequency and a signal operating power of the signal source 10 to obtain the channel radiation pattern formed by each of the RF modules 20 such as the RF modules 201-209 in the cavity 50 (as shown in FIG. 3B). According to the channel radiation pattern of each of the RF modules 20 such as RF modules 201 up to 209 and a corresponding channel weight value of each of the RF modules 20 such as RF modules 201 up to 209, a plurality of mode radiation patterns can be obtained, and the channel weight value is used to control each of the RF modes. The channel weight value is used as a basis for adjusting the RF phase and the RF operating power of each of the RF modules 20 to generate various mode radiation patterns. Subsequently, the control module 30 performs a mode analysis on these mode radiation patterns to obtain a plurality of operating modes, wherein each of the operating modes corresponds to a mode radiation pattern and a set of channel weight values, wherein channel weight values are derived from each of the mode excitation parameter sets. Finally, based on the uniformity of the electromagnetic field distribution of the mode radiation pattern, selecting several operating modes with the desired uniformity of the electromagnetic field from these operating modes to form a mode excitation parameter set. The source operating frequency of the signal source 10 is modulated, and other operating modes are obtained in the same manner to form another mode excitation parameter set.

In detail, in order to obtain the mode excitation parameter set, in one embodiment, the control module 30 may control the first RF module 201 up to the ninth RF module 209 to obtain the mode radiation pattern according to a set of channel weight values under a condition that the operating frequency of the signal source is 3.3 GHz. Similarly, the control module 30 can also control the first RF module 201 up to the ninth RF module 209 with a different RF operation power and a different RF phase according to another set of channel weight values for the source operating frequency of 3.3 GHz to obtain another mode radiation pattern. In another embodiment, the control module 30 controls the first RF module 201 up to the ninth RF module 209 to have the same or a different RF operating power and a different RF phase by using the operating frequency of signal source as 3.5 GHz.

The control module 30 generates the mode excitation parameter set according to the electromagnetic field distribution uniformity corresponding to the mode radiation pattern calculated by a uniformity formula, and the uniformity formula is as follows:

$$Uni = 1 - \frac{\text{Max} - \text{Min}}{\text{Max} + \text{Min}}$$

wherein Uni is the uniformity; Max is the maximum energy of each of these operating modes; Min is the minimum energy of each of these operating modes.

The control module 30 can select an operating mode with better uniformity from a plurality of operating modes at the operating frequency of the signal source of 3.3 GHz according to the electromagnetic field distribution uniformity corresponding to each of the mode radiation patterns, and use the selected operating mode as a mode excitation parameter set corresponding to 3.3 GHz. Similarly, the control module 30 can obtain the mode excitation parameter set corresponding to the operating frequency of the signal source such as 3.5 GHz in the same manner. In addition, the control module 30 can store an acquired mode excitation parameter set into the first database 41.

After repeatedly performing the above-mentioned actions with different operating frequencies of the signal source, all obtained mode excitation parameter sets corresponding to each operating frequency of the signal source can be stored in the first database 41. Therefore, the control module 30 can assign the RF operating power of the RF modules 201 up to 209 according to the channel weight value. Accordingly, by assigning the RF operating power of the RF modules 201 up to 209 by the channel weight value, several operating modes are selected according to the electromagnetic field distribution uniformity to form a mode excitation parameter set, so that the error of the electric field strength at each position in the cavity 50 can be minimized.

In addition, for one or more materials to be processed, the control module 30 can generate a material processing event set according to the uniformity of energy distribution, and this material processing event set has at least one of operating mode in the aforementioned mode excitation parameter sets (usually having a plurality of operating modes), and this material processing event set is stored in the second database 42 by the control module 30.

In one embodiment, the mode excitation parameter set can be as shown in Table 1 below, where Po is the RF operating power in a unit of watt (W); Ph is the RF phase in a unit of degree (Deg).

TABLE 1

| | Freq. | | | | | | | |
|---|---|---|---|---|---|---|---|---|
| | 3.3 GHz | | 3.3 GHz | | 3.5 GHz | | 3.5 GHz | |
| | Index of operating mode | | | | | | | |
| Index of | 1 | | 2 | | 3 | | 4 | |
| RF module | Po | Ph | Po | Ph | Po | Ph | Po | Ph |
| 201 | 2.36 | 180.00 | 1.20 | 0.00 | 1.759 | 360.00 | 9.96 | 180.00 |
| 202 | 13.64 | 244.47 | 3.37 | 340.23 | 2.690 | 13.90 | 3.23 | 47.69 |
| 203 | 7.10 | 242.50 | 0.77 | 217.26 | 8.011 | 189.62 | 5.60 | 10.30 |
| 204 | 6.21 | 184.95 | 0.94 | 152.05 | 19.400 | 149.45 | 6.11 | 119.81 |
| 205 | 0.54 | 74.59 | 1.46 | 168.26 | 4.713 | 346.26 | 5.41 | 97.33 |
| 206 | 3.76 | 301.08 | 8.30 | 193.1 | 3.081 | 1.49 | 0.46 | 313.00 |
| 207 | 14.48 | 5.81E-15 | 1.05 | 279.83 | 3.322 | 180 | 25.32 | 257.38 |
| 208 | 6.78 | 187.69 | 15.76 | 174.72 | 0.496 | 233.85 | 7.53 | 260.17 |
| 209 | 0.01 | 346.51 | 2.03 | 1.62 | 0.549 | 78.58 | 7.91 | 123.11 |
| Total power | 54.88 | | 34.88 | | 44.02 | | 71.52 | |

The operating modes selected by the control module 30 according to the electromagnetic field distribution uniformity of each operating mode may be as shown in Table 1, and two operating modes at the operating frequency of the 3.3 GHz of the signal source are a set of mode excitation parameters. Therefore, the example in Table 1 has two mode excitation parameter sets, but the present disclosure does not limit the actual value of the operating frequency of the signal source and the number of mode excitation parameter sets.

On the other hand, in order to obtain the aforementioned material processing event sets, the control module 30 generates a plurality of material processing event sets based on the average power and the total time corresponding to the material to be processed. In detail, for each material to be processed, there is total energy required to heat the material to the desired temperature, and the total energy is determined by the material recipe, the average power and the total time of the material to be processed. A user interface configured to regulate the material recipe, the average power, and the total time. Therefore, the control module 30 can select a part of the operating modes from the mode excitation parameter set according to the total power and other parameters shown in Table 1, and take the selected operating modes as a material processing event set of the material to be processed.

Please refer to Table 1 and Table 2 together, where the material processing event set can be as shown in Table 2 below. In some embodiments, the material processing event set 1 is composed of operating mode 1 at the operating frequency of 3.3 GHz of the signal source, as well as operating mode 2, and operating mode 3 at the operating frequency of 3.5 GHz of the signal source; the material processing event set 2 is composed of operating mode 1 at the operating frequency of 3.3 GHz of the signal source, as well as operating mode 2, and operating mode 3 at the operating frequency of 3.5 GHz of the signal source.

TABLE 2

| Material processing event sets | Operating modes | | |
|---|---|---|---|
| Material processing event set 1 | Operating mode 1 | Operating mode 2 | Operating mode 3 |
| Material processing event set 2 | Operating mode 1 | Operating mode 3 | Operating mode 4 |
| Material processing event set 3 | Operating mode 2 | Operating mode 3 | Operating mode 4 |

As aforementioned, one material processing event set corresponds to at least one material to be processed, and one material processing event set preferably has a plurality of operating modes, and the second database 41 stores a plurality of material processing event sets corresponding to a plurality of materials to be processed.

In addition, similar to the above mentioned, the control module 30 generates the material processing event sets according to the uniformity of the energy distribution, and the uniformity can be calculated by the uniformity formula shown above. That is, because the RF modules 201 up to 209 generate energy according to each operating mode, they will generate corresponding mode radiation patterns. Each of the operating modes corresponds to one mode radiation pattern characterized by an eigenvalue and a weighting vector correspondingly, and the control module selects the part of the operating modes in the selected material processing event set and can be identified according to the eigenvalues and the weighting vectors correspondingly. Each of the operating modes corresponds to a mode radiation pattern, and each of the mode radiation patterns has a standard deviation correspondingly, and the control module selects the part of the operating modes for the material processing event set according to the standard deviations of the selected part of the operating modes and the selected one of standard deviation of the material processing event set In FIG. 2, please refer to step S103 of selecting one of the material processing event sets to generate a material processing schedule. In one embodiment, when the material to be processed is the material to be processed 60 shown in FIG. 1, the control module 30 selects one of the material processing event sets stored in the second database 41 according to the material recipe, the average power, and the total time corresponding to the material to be processed 60, and assign a plurality of operation times to each of event blocks in the selected material processing event set according to the average power and the total time corresponding to the material to be processed 60 to generate the material processing schedule as shown in Table 3 below.

TABLE 3

| schedule | event blocks | | |
|---|---|---|---|
| material processing schedule 1 | Operation time 1 Operating mode 1 | Operation time 2 Operating mode 3 | Operation time 3 Operating mode 4 |

In detail, the operating modes of the material processing event set can be arranged in order or randomly, as long as the energy generated according to the operating modes can meet the total energy required by the material to be processed. Therefore, each operating mode of the material processing schedule corresponds to an operation time. Taking Table 3 as an example, the material processing schedule 1 in Table 3 is generated by the material processing event 2 in Table 2, and each operating mode has a corresponding operating time, wherein operating time 1 up to operating time 3 can be the same or different time intervals depending on the usage requirements. The product of the RF operation power and the operation time of each operating mode is the energy that the RF module 20 can emit when the operating mode is executed, and the total energy generated by all operating modes during the schedule of the material processing performed by the RF modules 20 is preferably the total energy required to heat the material to be processed 60 to the desired temperature.

That is, the control module 30 can first select the parameters of the operating mode 1 from the mode excitation parameter set according to the material processing schedule 1 shown in Table 3, and based on the operating mode 1 and its corresponding operation time 1, controls the RF modules 20 to radiate energy to the cavity 50, and then in the same way based on the operating mode 3 and its corresponding operation time 2, the RF modules 20 radiates energy to the cavity 50, and then the RF modules 20 described here radiates energy. The order in a performed sequence of the embodiment is only an example, and the present disclosure does not limit the order in the performed sequence of energy radiated by the RF modules 20.

However, if the total energy generated by all operating modes in the material processing schedule does not reach the total energy required to heat the material to be processed 60 to the desired temperature, the control module 30 can control the signal source 10 and the RF module 20 to emit energy again according to the material processing schedule. The control module 30 can also be based on another material processing schedule to control the signal source 10 corresponding to another material processing event set and the RF modules 20 emit energy. The present disclosure is not limited to this.

Step S105 is controlling the operating frequency of the signal source and the RF phase and the RF operating power of the plurality of RF modules, and controlling the power signal with the RF modules to radiate energy to the cavity. After obtaining the material processing schedule, the control module 30 can adjust the operating frequency of the signal source 10, and determine the RF phase and the RF operating power of the RF modules 20 according to the channel weight value. That is, as shown in Table 1, since each operating mode is the RF phase and the RF operating power of the RF modules 20 at a specific source operating frequency of the signal source 10, therefore, after the control module 30 generates the material processing schedule shown in Table 3, it can determine the operating frequency of the signal source 10 and the RF modes according to the operating mode and a corresponding operation time, or one time slot, in the material processing schedule, to have the RF phase and the RF operating power of the RF modules 20 enabling the RF modules 20 to collectively generate a desired mode radiation pattern through the characteristics of time-varying frequency.

In detail, the operating frequency of signal source may include at least a first operating frequency of signal source (for example, 3.3 GHz) and a second operating frequency of signal source (for example, 3.5 GHz), and the material processing schedule 1 shown in Table 3 is, for example, generated by the material processing event set 2 in Table 2. That is, the material processing event set 2 includes an operating mode 1 corresponding to the operating frequency of a first signal source, operating modes 3 and 4 corresponding to the operating frequency of the second signal source, and operating times 1 up to 3 respectively corresponding to operating modes 1, 3, and 4. Therefore, the control module 30 can control the signal source 10 to feed a first power signal corresponding to 3.3 GHz to the RF modules 20 according to the material processing schedule 1, and control the RF phase and the RF operating power of the RF modules 20 according to the operating mode 1. After the signal source 10 feeds a plurality of first power signals to the RF modules 20, the RF modules 20 control the received power signals to radiate energy to the cavity 50. The control module 30 then controls the signal source 10 to feed the second power signal corresponding to 3.5 GHz to the RF modules 20, and controls the RF phase and RF operating power of the RF modules 20 according to the operating mode 3. The control module 30 then controls the signal source 10 to feed a second power signal corresponding to 3.5 GHz to the RF modules 20, and controls the RF phase and the RF operating power of the RF modules 20 according to the operating mode 4. After the signal source 10 feeds a plurality of second power signals to the RF modules 20, the RF modules 20 control the received power signals to radiate energy to the cavity 50.

In other words, the control module 30 can sequentially control the signal source 10 according to the material processing schedule, to feed a first power signal corresponding to a first operating frequency of the signal source to each of the RF modules 20, and feed a second power signal corresponding to a second operating frequency of the signal source to the each of RF modules 20.

Wherein, each of the RF modules 20 is preferably electrically connected to an independent radiation unit, therefore, the each of RF modules 20 can radiate energy to the cavity 50 through its respective radiation unit, and the RF modules 20 radiates energy based on the RF operating power and the RF phase of each RF module in the operating mode.

Figure 3A:
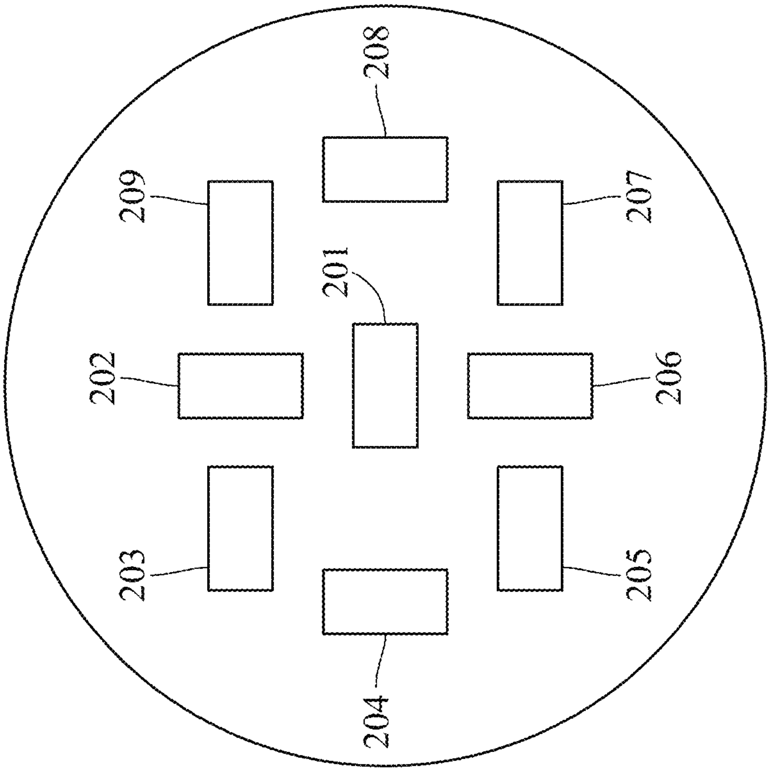
FIG. 3A is a schematic diagram of a plurality of RF modules.
Figure 3B:
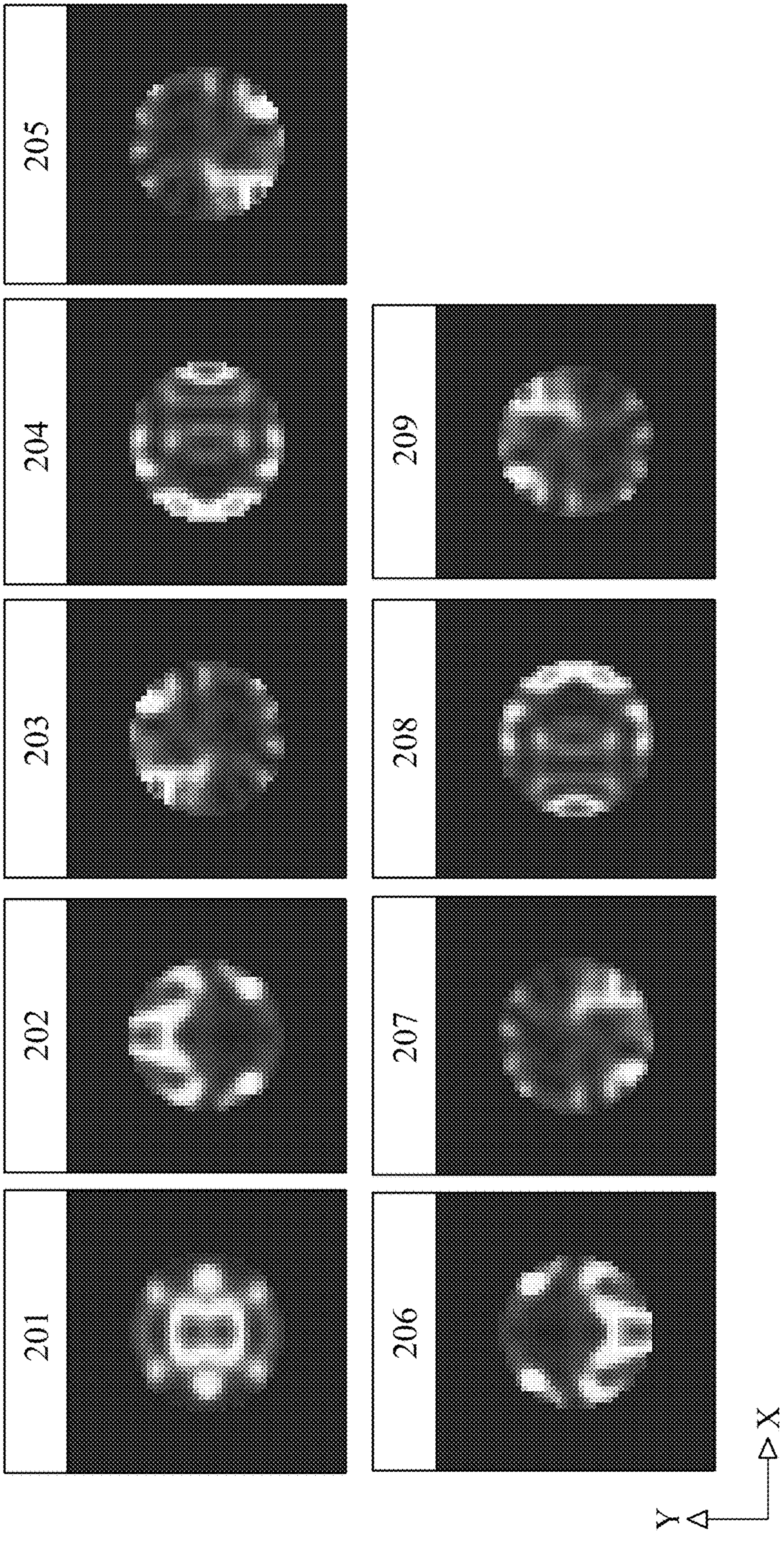
FIG. 3B is an embodiment of a radiation pattern of a plurality of channels generated by controlling the RF module shown in FIG. 3A.
Figure 3C:
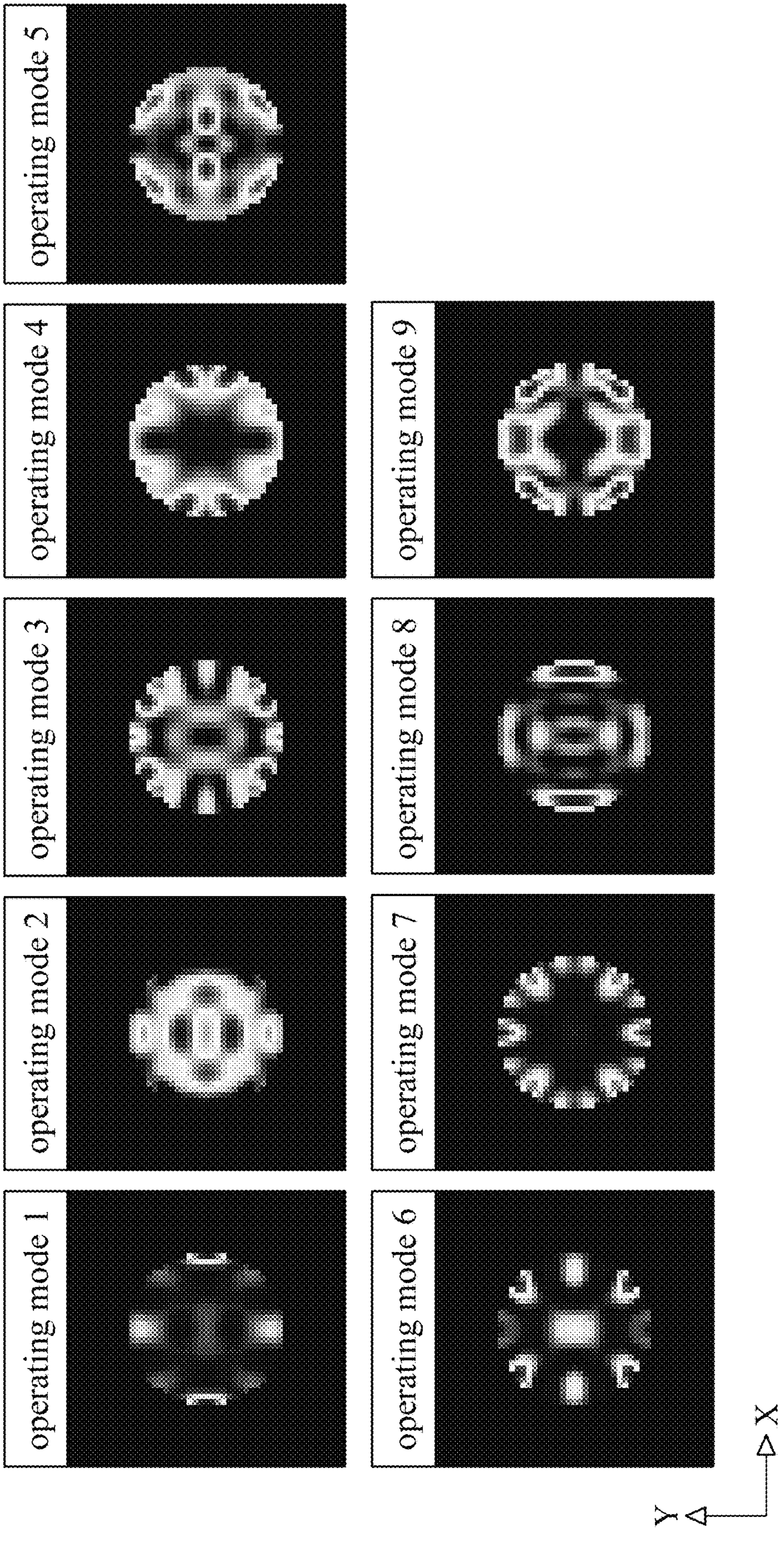
FIG. 3C is an embodiment of mode synthesizing a plurality of mode radiation patterns generated by one or more channel radiation patterns in FIG. 3B.

Please refer to FIG. 3A up to FIG. 3C, in which FIG. 3A is a schematic diagram of a plurality of RF modules. FIG. 3B is an embodiment of a radiation pattern of a plurality of channels generated by controlling the RF module shown in FIG. 3A. FIG. 3C is an embodiment of mode synthesizing a plurality of mode radiation patterns generated by one or more channel radiation patterns in FIG. 3B. Wherein the unit of the horizontal axis and the vertical axis of each channel radiation pattern and each mode radiation pattern is millimeter (mm), and the lighter-colored area in the channel radiation pattern and the mode radiation pattern is an area with higher energy, where the energy is a normalized electric field energy, and the energy unit is Joule per cubic meter (J/m3). Moreover, the frequency band of the operating frequency of the signal source can be 3.2 GHz up to 3.8 GHz, where the frequency resolution is 0.1 GHz, and the radiation patterns shown in FIG. 3B and FIG. 3C are simulated with the operating frequency of signal source of 3.2 GHz.

The RF modules 20 may be a plurality of RF modules. In the schematic diagram of FIG. 3A, the RF modules 20 includes a first RF module 201 up to a ninth RF module 209, and RF module 201 up to RF module 209 are respectively electrically connected to independent radiation units. Therefore, as mentioned above, the control module 30 can obtain in advance the channel radiation patterns formed by each of the RF modules 201 to 209 in the cavity 50 shown in FIG. 3A (as shown in FIG. 3B). Then, the control module 30 can adjust the RF phase and the RF operating power of each of the RF modules 201 up to 209 according to the material processing schedule 1 and the mode excitation parameter sets, and perform the mode synthesis to obtain the required RF radiation pattern (as shown in FIG. 3C) based on the channel radiation pattern of FIG. 3B. FIG. 3C is an embodiment of nine mode radiation patterns corresponding to the operating mode 1 up to operating mode 9 respectively. The nine mode radiation patterns in FIG. 3C are obtained by controlling the RF phase and the RF operating power (or RF amplitude) of the RF modules 201 up to 209 in FIG. 3A by performing mode synthesis based on the channel radiation pattern shown in FIG. 3B.

In addition, the mode radiation pattern can be generated based on time as the basis of synthesizing mode radiation pattern. For example, the control module 30 can select operating mode 1, operating mode 3, and operating mode 6, and adjust the RF modules 201 up to 209 according to the operating mode 1 first, and control the RF modules 201 up to 209 according to the operating mode 1. After a preset period of time, the RF modules 201 up to 209 are adjusted according to mode 1 while the RF modules 201 up to 209 are adjusted according to the operating mode 3, and the RF modules 201 up to 209 are adjusted according to the operating mode 6 in the same way.

In step 105, the control module 30 selects the operating mode 1, the operating mode 3, and the operating mode 4 to generate a heating schedule according to the material processing schedule 1. The control module 30 first controls the radio frequency modules 201 up to 209 according to the operating mode 1 to generate a mode radiation pattern corresponding to the operating mode 1 to radiate energy to the cavity, and after passing through a first preset period of time, controls the radio frequency modules 201 up to 209 according to the operating mode 3 to generate a mode radiation pattern corresponding to the operating mode 3 to radiate energy to the cavity. After a second preset period of time, the control module 30 controls the radio frequency modules 201 up to 209 according to the operating mode 4 to generate mode radiation patterns corresponding to the operating mode 4 to radiate energy to the cavity. The above-mentioned mode radiation patterns corresponding to the operating modes 1, 3, and 4 respectively synthesize a uniform electromagnetic field pattern in the cavity.

Accordingly, the control module 30 distributes the RF operating power and further assigns an RF phase distribution to each of the RF modules according to one of the mode excitation parameter sets utilized in the one time slot of the material processing schedule, so as to have the RF modules radiate a power-signal-controlled energy to an application scenario. Beside, taking the embodiment of FIG. 3C as an example, the first database 41 can only store the operating parameters of nine operating modes, and according to the usage requirements, select the required operating modes from the nine operating modes and combine them into one or more material processing event sets, so as to save the storage space of the first database 41.

In summary, according to one or more embodiments of the present disclosure, the frequency reconfigurable phased array system and the material processing method performed by the array system can reduce the RF operating power of the phased array system while still being able to control the phase of the RF module. And the RF operating power is adjustable. In addition, according to one or more embodiments of the present disclosure, the frequency reconfigurable phased array system and the material processing method thereof can improve the uniformity of the electromagnetic field in the cavity, further improving uniformity of microwave heating. This makes the rapid thermal annealing (RTA) technology applying microwave heat in the semiconductor manufacturing process more efficient.

It will be apparent to those skilled in the art that various modifications and variations can be made to the phase control structure and the phase control array of the disclosed embodiments. It is intended that the specification and examples be considered as exemplars only, with a scope of the disclosure being indicated by the following claims and their equivalents.

What is claimed is:

1. A frequency reconfigurable phased array system, adapted to a material to be processed, including:

a signal source, configured to output an power signal with an adjustable frequency;

a plurality of radio frequency (RF) modules, which are signal-transmittably connected to the signal source to receive the power signal, wherein the RF modules further generate a plurality of mode radiation patterns according to a plurality of RF phases and RF operating power;

a control module, which is signal-transmittably connected to the signal source and the RF modules, wherein the control module uses a part of RF phases and a part of the RF operating power corresponding to a part of the mode radiation patterns as a plurality of operating modes according to an electromagnetic field distribution uniformity of the mode radiation patterns, uses one or more of the operating modes corresponding to a same operating frequency of the signal source as one mode excitation parameter set to generate a plurality of mode excitation parameter sets, wherein each of the mode radiation patterns is characterized by an eigenvalue and a weighting vector of electromagnetic field distribution correspondingly, and the control module selects a part of the operating modes from the mode excitation parameter sets as one material processing event set according to an energy distribution uniformity to generate a plurality of material processing event sets;

a first database, which is signal-transmittably connected to the control module and stores the mode excitation parameter sets; and a second database, which is signal-transmittably connected to the control module and stores the material processing event sets;

wherein the control module further generates a material processing schedule based on a material recipe, an average power, and a total time those are corresponding to the material to be processed;

wherein the control module controls an operating frequency of the signal source and the RF phase and the RF operating power of each of the RF modules according to the material processing schedule, and the mode excitation parameter sets control the signal source to feed the power signal corresponding to the operating frequency of the signal source to the RF modules, to have the RF modules control the power signal to radiate an energy to a cavity.

2. The frequency reconfigurable phased array system in claim 1, wherein each of the RF modules includes a phase shifter module and a power amplifier, and the control module controls the RF phase of each of the RF modules through the phase shifter module and the RF operating power of each of the RF modules through the power amplifier according to the mode excitation parameter sets.

3. The frequency reconfigurable phased array system in claim 1, wherein before the control module controls the operating frequency of the signal source according to the material processing schedule, the control module selects one from the material processing event sets according to the material recipe, and assigns a plurality of operation times to each of a plurality of event blocks in the selected material processing event set to generate the material processing schedule according to the average power and the total time.

4. The frequency reconfigurable phased array system in claim 1, wherein each of the mode excitation parameter sets further includes a plurality of channel weight values respectively corresponding to the RF phase and the RF operating power of each of the RF modules, and the control module controls the RF phase and the RF operating power of each of the RF modules according to a plurality of channel weight values derived from each of the mode excitation parameter sets.

5. The frequency reconfigurable phased array system in claim 1, wherein the operating frequency of the signal source includes a first source operating frequency and a second source operating frequency, and the control module controls the signal source according to the material processing schedule, and feeds a first power signal corresponding to the first source operating frequency to each of the RF modules, and feeds a second power signal corresponding to the second operating frequency to the each of the RF modules.

6. The frequency reconfigurable phased array system in claim 1, wherein the control module includes a user interface configured to regulate the material recipe, the average power, and the total time.

7. The frequency reconfigurable phased array system in claim 1, wherein the control module selects the part of the operating modes from the mode excitation parameter sets as the one material processing event set according to the eigenvalues and the weighting vectors correspondingly.

8. The frequency reconfigurable phased array system in claim 1, wherein each of the mode radiation patterns has a standard deviation correspondingly, and the control module selects the part of the operating modes for the material processing event set according to the standard deviations of the selected part of the operating modes and the standard deviation of the selected one of the material processing event set.

9. A material processing method performed by a frequency reconfigurable phased array system, adapted to processing a material to be processed, the method including:

generating, by a control module, a plurality of operating modes by using a part of radio frequency (RF) phases and a part of RF operating power corresponding to a part of a plurality of mode radiation patterns generated by a plurality of RF modules as a plurality of operating modes according to an electromagnetic field distribution uniformity of the mode radiation patterns, wherein each of the operating modes corresponds to the RF phase and the RF operating power of each of the RF modules;

generating, by the control module, a plurality of mode excitation parameter sets-by using one or more of the operating modes corresponding to a same operating frequency of a signal source as one mode excitation parameter set;

selecting, by the control module, a part of the operating modes from the mode excitation parameter sets as one material processing event set based on an energy distribution uniformity to generate a plurality of material processing event sets, wherein each of the mode radiation patterns is characterized by an eigenvalue and a weighting vector of the electromagnetic field distribution correspondingly;

selecting, by the control module, one of the material processing event sets to generate a material processing schedule based on a material recipe, an average power, and a total time corresponding to the material to be processed; and controlling, by the control module, an operating frequency of the signal source and the RF phase and the RF operating power of each of the plurality of RF modules according to the material processing schedule and the mode excitation parameter sets, to have the RF modules control a power signal to radiate an energy to a cavity;

wherein the RF modules are signal-transmittably connected to the signal source to receive a power signal output by the signal source.

10. The material processing method in claim 9, wherein each of the RF modules includes a phase shifter module and a power amplifier, and controlling, by the control module, the RF phase and the RF operating power of each of the RF modules includes:

controlling, by the control module, the RF phase of the RF modules through the phase shifter module according to the mode excitation parameter sets, and controlling the RF operating power through the power amplifier.

11. The material processing method in claim 9, wherein the material processing schedule includes:

selecting, by the control module, one from material processing event sets according to the material recipe; and assigning, by the control module, a plurality of operation times to a plurality of operating modes respectively, in a selected material processing event set according to the average power and the total time to generate the material processing schedule.

12. The material processing method in claim 9, wherein each of the mode excitation parameter sets further include a plurality of channel weight values respectively corresponding to the RF phase and RF operating power of each of the RF modules, and radiating, by the RF modules, the energy to the cavity includes:

assigning, by the control module, the RF phase and the RF operating power of each of the RF modules according to the channel weight values, wherein the channel weight values are obtained according to the electromagnetic field distribution uniformity.

13. The material processing method in claim 9, wherein the operating frequency of the signal source includes a first operating frequency of the signal source and a second operating frequency of the signal source, and controlling, by the control module, the operating frequency of the signal source according to the material processing schedule includes:

sequentially controlling, by the control module, the signal source according to the material processing schedule to feed a first power signal corresponding to the first operating frequency of the signal source to the RF modules, and feed a second power signal corresponding to the second operating frequency of the signal source to the RF modules.

14. The material processing method in claim 9, wherein the control module includes a user interface, and before the material processing schedule is generated by the control module from the one of the material processing event sets, the method further includes:

accessing the material recipe, the average power and the total time through the user interface.

15. The material processing method in claim 9, wherein generating, by the control module, the material processing event sets according to the energy distribution uniformity includes:

selecting, by the control module, the part of the operating modes from the mode excitation parameter sets as the one material processing event set according to the eigenvalues and the weighting vectors correspondingly.

16. The material processing method in claim 9, wherein each of the mode radiation patterns has a standard deviation correspondingly, and generating, by the control module, the material processing event sets according to the energy distribution uniformity includes:

selecting, by the control module, the part of the operating modes from the mode excitation parameter sets as the one material processing event sets according to the standard deviations.

* * * * *